United States Patent Office 3,262,773
Patented July 26, 1966

3,262,773
PROCESS FOR THE REMOVAL OF ARSENIC, ANTIMONY, TIN AND OTHER ACID OXIDE PRODUCING IMPURITIES FROM COPPER
Hans Werner Fritze, Hamburg, Germany, assignor to Norddeutsche Affinerie, Hamburg, Germany
No Drawing. Filed Feb. 18, 1963, Ser. No. 259,385
Claims priority, application Germany, Feb. 22, 1962, N 21,243
7 Claims. (Cl. 75—76)

This invention relates to a dry refining process for the removal of arsenic, antimony, tin and other acid oxide forming elements from molten copper by combining the acid oxides of such elements with basic materials such as alkaline earth oxides, in particular calcium oxide, in the slag.

It is old to subject crude cooper containing the usual impurities such as Fe, Bi, Pb, As, Sb, etc. to refining by oxidation in the presence of alkaline earth oxides produced by the addition of alkaline earth hydroxides and/or carbonates. The steam or carbon dioxide thereby released will then replace the air that is generally used for oxidizing the copper to liberate it from the impurities.

It is also old to combine the alkaline earth oxides in the slag with the oxidized arsenic, it being known that arsenic can be effectively removed from the copper by the addition of quicklime, either alone or together with soda and magnesia. It is additionally known that the removal of arsenic by the addition of quicklime is facilitated by the blowing in of air into the melt. It is further known to remove arsenic from copper by blowing melts to which additions of soda ash, sodium nitrate or copper oxide have been made, the latter being incorporated with the slaked lime. Another proposal is to remove the arsenic from the copper by means of quicklime alone, or quicklime, soda and magnesia under reducing conditions, as by poling.

It has also been proposed in the known process of removing antimony with soda, to use a mixture of soda and lime. Here, however, the admixture of lime has been only to make the furnace lining less vulnerable to attack by the soda. It has been additionally proposed to remove the arsenic, antimony and tin from the copper by means of alkali or alkaline earth sulfates, either alone or in admixture with alkali or alkaline earth carbonates. Alkaline earth sulfates have an oxidizing effect on the copper, being themselves converted into alkaline earth oxides by the atmosphere that is usually present in such furnaces. However, as long as there is any sulfur present in the sulfate containing slag, there remains the ever present danger of some of the sulfur being taken up by the copper, or that its removal from the copper may be rendered more difficult.

The object of this invention, therefore, is to provide a novel process for the efficient removal of arsenic, antimony and tin impurities, as well as others forming acid oxides, from copper.

Upon further study, to attain the objects of this invention, it has been found that a slag with a higher calcium oxide content that is capable of removing not only arsenic but also antimony, tin and other acid-oxide forming elements can be formed by subjecting the slag to an oxidizing treatment after the addition thereto of calcium oxide or calcium oxide precursors such as calcium carbonate or calcium hydroxide, with or without the addition of fluxes, and without the addition of sulfur or sulfates to the molten material. By this method the amount of arsenic, antimony and tin can be reduced to less than 0.01% of each.

The amounts of these elements in the slag with the increased calcium oxide content can be increased considerably, while the amount of copper in the slag is kept within limits. The slags produced in such a manner may contain from 35% to 45% lime. The concentration of the impurities removed from the copper are much greater in the slag, while the residual amounts of these impurities are much smaller than would be found after an oxidizing treatment alone under similar conditions. The amount of copper in the slag relative to its amount in the crude copper remains the same or is only slightly greater than in the usual thermal refining of crude copper.

Although it is known that arsenic and antimony can be effectively removed from copper by basic treatment with alkali oxides or alkali oxide carriers, the slags produced by such processes will strongly attack any kind of ceramic apparatus. With basic treatment by alkaline earth oxide slags, and especially with lime slags, no more than the usual deterioration will be suffered by basic linings such as those of dolomite, magnesite or chrome-magnesite.

The arsenic-antimony-tin slags can be used, for example, as lime carriers in metallurgical processes as in the raw lead-copper multi-shaft furnace process. Moreover, the copper produced electrolytically therefrom will be free from arsenic, antimony and tin, and thereby result in noteworthy advantages in avoiding the formation of troublesome slimes which in turn simplifies the electrolytic processes, the preparation of lyes and the subsequent separation of nickel. The commercially unprofitable separation of the arsenic, antimony and tin during the preparation of the lye is thus avoided. The recovery of precious metals is not complicated by the presence of arsenic, antimony and tin and is thus simplified. The materials handling of these three elements in a metallurgical plant is therefore greatly simplified.

In the process of this invention, the impure copper to be freed of arsenic, antimony and/or tin and other acid-oxide forming elements are melted on a basic hearth with additions of quicklime or suitable quicklime-containing materials. With total arsenic, antimony and tin contents up to 120 gram-moles/ton, about 4% to 12% by weight of quicklime based on the weight of the impure copper, has been found suitable.

The molten material is then subjected to the oxidizing treatment, as by blowing air or oxygen into or upon it, or by treating it with materials such as alkaline earth hydroxides or carbonates which produce oxidizing gases, or by suitable oxygen carriers such as cupric oxide. The oxidation should be continued until at least 1% by weight of oxygen content (based on the weight of the copper) is reached in the copper-rich metal bath, this condition being indicated by the familiar blue-red tessellated fracture of a solidified sample from the molten copper. It has been found that as the oxygen content increases, the contaminating elements will be brought below the detectable 0.01% limit in the order tin-arsenic-antimony, the most difficult one to remove being antimony. The copper-rich oxide melt, or the oxide such as cupric oxide which was to serve as an oxygen carrier, forms a slag during the oxidation process with the added quicklime that is being dissolved in the molten oxide, this slag having an increased calcium oxide content which thereby takes up the arsenic, antimony and tin.

The usual fire refining of the copper then also occurs. It is also expedient, during the treatment of the crude copper, to include in the fire refining the process herein described.

Suitable temperatures have been found to be 1250° C. to 1300° C.

The quicklime is preferably so added that lime saturation of the slag is achieved as rapidly as possible during the oxidizing treatment, e.g. by the various improved methods subsequently described, and is maintained for the duration thereof. The visible signs that melting is proceeding in this way are that at the end of the oxidation the slag still contains undissolved pieces of lime.

The lime in the slag will thus be kept at constant and maximum activity. This ensures the best possible effects of the removal of arsenic, antimony and tin, and these elements will then remain in the slag, even after being exposed to extensive oxidation treatment. Incomplete lime saturation, however, has the effect of not only causing much loss of copper, but also of diluting the lime in the slag, the effect of which is to return the impurities, and especially the antimony, to the copper. Without lime saturation, the removal of arsenic, tin and especially antimony, will not be carried below the mentioned limits of analytical detection.

It was found that when the total initial arsenic, antimony and tin contents in the molten copper were between 0.50% and 0.95% only the lumps of excess lime, which are impregnated with the oxides of copper, will contain about 5% by weight total content of arsenic, antimony and tin. Evidently these lumps contain, besides quicklime, also solid compounds of the lime with the oxides of these three elements.

In the fire refining process the solution of the lime in the oxidized slag occurs more slowly and only up to a limited lime content.

Improved results are obtained if the quicklime is added in pieces of uniform size. Suitable sizes are between 3 mm. and 100 mm. Suitable classification spreads are 5 or less. For example, pieces measuring 4 mm. to 20 mm. and 8 mm. to 40 mm. are suitable.

Improved results are also obtained by employing soft burnt lime, e.g. pearl-lime, as the quicklime.

Improved results are further obtained by the addition of suitable fluxes. Such fluxes and other additions as may be desired are preferably classified, the classification sizes given above for quicklime being also suitable for such added materials.

A slag with an increased lime content has less oxygen activity than one containing predominantly copper oxide. That prevents the production of a sufficiently high oxygen content in the metal. This may be the reason for the fact that the various proposals mentioned above did not effect a satisfactory technical removal of arsenic, antimony and tin from copper in compounding them with calcium oxide or other alkaline earth oxides to deposit them so in such basic slags. It has now been found that the desired high oxygen content in the copper-rich melt can be easily reached by the addition of a material having a tendency to become demixed from copper oxide, thus raising the oxygen activity in the metal bath, namely fluorspar and/or the other alkaline earth fluorides, besides the addition of calcium oxide and/or the other alkaline earth oxides. It is fortunate and advantageous that fluorspar and the other alkaline earth fluorides act as fluxes in such basic slags.

It has been shown that by the addition of fluorspar, the process handling can be greatly improved. If correctly proportioned, there will be no unusual corrosion of the basic linings. Suitable proportions for quicklime and fluorspar have been found to be about 4 to 1 parts by weight respectively. Much greater proportions have appreciably less effect, whereas considerably smaller proportions will cause a much greater attack on the basic lining. With such slag handling, if the molten metal has a total arsenic, antimony and tin content of 0.50% to 0.95%, the slag with increased calcium oxide content will contain 6% to 12% arsenic, antimony and tin collectively with only 10% to 25% copper. The lime content will then be 35% to 45%, and the slag will be viscous.

It is, as will be easily understood, desirable to add the material having a tendency to become demixed from copper oxide also in classified pieces in uniform size, as mentioned above.

It has been surprisingly noticed that during oxidation, e.g. after being blown somewhat more than necessary to produce the blue-red tessellated fracture of the metal, there will be present, in addition to the calcium oxide containing slag, a second thinly flowing slag that is rich in copper oxide but whose calcium oxide content is limited to about 5% to 12% and which is in a separate stratum beneath the slag with high lime content. The copper oxide rich slag contains only little arsenic, antimony and tin. With suitable furnaces such as rotating flame furnaces, this slag can be easily poured off so as to leave only the metal and the lime slag in the furnace. The lime slag can be drawn off separately with the help of wooden implements. The presence of more than just a small amount of copper oxide rich slag is an external indication that the oxidation stage with maximum removal of arsenic, antimony and tin has been reached.

In the presence of fluorspar, chrome magnesite installations are especially suitable because of the presence of chromic oxide and the tendency of separation between fluorspar and the heavy metal oxides.

It is known that a slag cannot be completely drawn off from a metal bath, especially not a viscous slag like the lime slag. If the metal after being oxidized is reduced in the same furnace, or deoxygenated, e.g. by poling, then with diminishing oxygen content there will be some re-migration of the copper impurities previously taken up by the slag. If the slag residues contain large amounts of such elements, then such re-migration will be considerable. It has been found that after poling, there again appeared arsenic, tin, and especially antimony in a total amount of about 0.1%.

If the copper after subsequent reduction or deoxygenation treatment is to remain free from arsenic, antimony and tin, then after the oxidizing treatment it should be removed and transferred to another furnace while the slag is carefully held back. Such a second furnace should then be carefully guarded against entrance of any carriers of arsenic, antimony or tin.

If the slag is saturated with lime, then alkali oxides or alkali oxide carriers can be added as basic fluxes, without causing excessive loss of basic ingredients.

It has been found to be especially advantageous not to effectuate the oxidation treatment too rapidly. The slowest part of the process, whose speed cannot be controlled and which therefore determines the speed of the process, is the transfer of arsenic, antimony and tin, respectively, with their combined oxygen from the molten copper to the slag. The loading of the metal bath with oxygen, the speed of which can be controlled, is purposely carried out slowly enough to be coextensive in speed with the migration of these elements from the metal bath into the slag. The above described removal of the arsenic, antimony and tin can therefore be accomplished with the addition of relatively little quicklime and with only relatively little slagging of the copper, while the slag with increased calcium oxide content will be especially greatly enriched of arsenic, antimony and tin.

With arsenic, antimony and tin contents of more than 120 gram-moles/ton, it can be advantageous to carry out the process in two or more steps. The slags from later steps can then be added as additions to previous steps of later charges.

A modification of this process consists in first oxidizing the copper without the addition of any quicklime until it just begins to show the blue-red tessellated fracture, then giving the required additions, and then continuing the oxidation to bring the arsenic, antimony and tin into the slag. After the first oxidation but before giving the required additions, a slag which is rich in copper oxide but poor in arsenic, antimony and tin can be drawn off. Such a modification can be advisable e.g. in case of high nickel, iron and sulfur contents. Most of the iron and nickel will then be removed with the first drawn off portion of the slag. Copper with a blue-red tessellated fracture will hold, as known, not more than about 0.5% nickel. In case of a higher initial nickel content in the crude copper, the excess will be taken up by the slag during oxidation. It may be advisable to keep this nickel separate from those slags which are rich in arsenic, antimony and tin.

For the process of this invention, it is permissible, instead of quicklime or calcium oxide precursors, to use other alkaline earth oxides or their precursors, and this applies also to alkaline earth fluorides. Besides arsenic, antimony and tin, other acid-oxide forming impurities can be removed from the copper and enriched in the phases of elevated alkaline earth oxide content.

Without further elaboration, it is believed that one skilled in the art can use this invention to its fullest extent, consequently the following specific embodiments are merely exemplary of this invention, and are not to be considered limitative in any way whatsoever.

The examples given of this process are all experimental melts with 10 kg. of crude copper. The additional materials are pearl-lime and fluorspar. By pearl-lime is meant a soft burned lime, produced by burning pellets of carbonated lime.

The copper oxide rich slag is referred to in the examples as liquid slag (i.e. "flow-slag"), and the slag with the higher lime content as viscous slag (i.e. "draw-slag").

The blowing velocities are based on conditions at 20° C. and 1 atmosphere.

The designation "n.d." in the examples means "not determined."

*Example 1*

Initial materials:
    10.3 kg. crude copper.
    0.500 kg. pearl-lime.
    0.125 kg. fluorspar.
Oxygen addition:
    Air blowing in; rate of blowing far over 21 cm.$^3$/sec.
    Duration of blowing 30 minutes.
Temperature: 1,250° C. to 1,300° C.

| Metal composition | As | Bi | Ni | (O) | Pb | Sb | Sn |
|---|---|---|---|---|---|---|---|
| After melting down, percent | 0.46 | 0.03 | 0.5 | 0.7 | 0.5 | 0.24 | <0.01 |
| After blowing, percent | <0.01 | 0.03 | 0.4 | 1.3 | 0.3 | <0.01 | <0.01 |

| Slag composition | As | CaO | Cu | Ni | Sb | Sn |
|---|---|---|---|---|---|---|
| Liquid slag, percent | 0.4 | 9.0 | 70.4 | n.d. | 0.4 | n.d. |
| Viscous slag, percent | 8.0 | 40.7 | 18.4 | n.d. | 6.0 | n.d. |

2.6% of the copper migrated into the slag.

*Example 2*

Initial materials:
    10.3 kg. crude copper.
    0.500 kg. pearl-lime.
    0.125 kg. fluorspar.
Oxygen addition:
    Air blowing in; rate of blowing 21 cm.$^3$/sec.
    Duration of blowing 103 minutes.
Temperature: 1,250° C. to 1,300° C.

| Metal composition | As | Bi | Ni | (O) | Pb | Sb | Sn |
|---|---|---|---|---|---|---|---|
| After melting down, percent | 0.55 | 0.03 | 0.44 | 1.0 | 0.82 | 0.21 | 0.42 |
| After blowing, percent | <0.01 | 0.02 | 0.16 | 1.4 | 0.16 | <0.01 | <0.01 |

| Slag composition | As | CaO | Cu | Ni | Sb | Sn |
|---|---|---|---|---|---|---|
| Liquid slag, percent | 0.28 | 10.2 | 73.7 | 0.6 | 0.30 | 0.5 |
| Viscous slag, percent | 4.0 | 32.1 | 28.4 | 0.9 | 4.2 | 5.9 |

2.1% of the copper migrated into the slag.

*Example 3*

Initial materials:
    11.7 kg. crude copper.
    0.500 kg. pearl-lime.
    0.125 kg. fluorspar.
Oxygen addition:
    Blowing in with air and blowing on of oxygen.
    Rate of air blowing 21 cm.$^3$/sec.
    Rate of oxygen blowing 2,200 cm.$^3$/sec.
    Duration of air blowing 22 minutes.
    Oxygen blowing was commenced in the 8th minute of air blowing.
    Duration of oxygen blowing 4½ minutes.
Temperature: 1,250° C. to 1,300° C.

| Metal composition | As | Bi | Ni | (O) | Pb | Sb | Sn |
|---|---|---|---|---|---|---|---|
| After melting down, percent | 0.85 | 0.03 | 0.63 | 0.7 | 1.33 | 0.33 | 0.43 |
| After blowing, percent | <0.01 | 0.02 | 0.43 | 1.3 | 0.44 | <0.01 | <0.01 |

| Slag composition | As | CaO | Cu | Ni | Sb | Sn |
|---|---|---|---|---|---|---|
| Liquid slag, percent | 1.0 | 12.7 | 62.3 | 1.4 | 0.9 | 1.7 |
| Viscous slag, percent | 3.5 | 42.5 | 22.4 | 1.1 | 2.4 | 5.9 |

2.1% of the copper migrated into the slag.

*Example 4*

Initial materials:
 10.9 kg. crude copper.
 0.500 kg. pearl-lime.
 0.125 kg. fluorspar.
Oxygen addition:
 Blowing in with air and blowing on of oxygen.
 Rate of air blowing 21 cm.³/sec.
 Rate of oxygen blowing 2,200 cm.³/sec.
 Duration of air blowing: 14 minutes.
 Oxygen blowing was commenced in the 6th minute of air blowing.
 Duration of oxygen blowing 3 minutes.
Temperature: 1,250° C. to 1,300° C.

| Metal composition | As | Bi | Ni | (O) | Pb | Sb | Sn |
|---|---|---|---|---|---|---|---|
| After melting down, percent | 0.21 | <0.01 | 0.76 | n.d. | 0.38 | 0.37 | 0.66 |
| After blowing, percent | <0.01 | <0.01 | 0.39 | 1.3 | 0.10 | <0.01 | <0.01 |

| Slag composition | As | CaO | Cu | Ni | Sb | Sn |
|---|---|---|---|---|---|---|
| Liquid slag, percent | 0.8 | 16.2 | 61.6 | 1.8 | 1.4 | 2.2 |
| Viscous slag, percent | 1.6 | 28.0 | 40.4 | 1.8 | 2.8 | 4.8 |

7.4% of the copper migrated into the slag.

In the preceding examples, the pearl-lime and the fluorspar were added to the molten material. It is advantageous when the surface of the molten material is free of slag before giving the additions. However, a small amount of slag before giving the additions can be accepted since no damage is caused thereby. After the additives have been introduced, a waiting time becomes necessary until the temperature of the additions has reached the temperature of the molten metal i.e. of 1250–1300° C. Then blowing begins. After blowing has been terminated, it is of advantage to wait for several minutes until all the slag has risen to the surface.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

In the following claims, calcium oxide is meant to include not only quicklime and the like, but also precursors of calcium oxide such as calcium carbonate and calcium hydroxide. It is also to be noted that other alkaline earth oxides and fluorides may be used in place of calcium.

What is claimed is:

1. A process for the removal of arsenic, antimony and tin impurities from crude copper comprising:
 (a) adding to molten crude copper 4 to 12% calcium oxide based on the weight of said crude copper and a substance which tends to become demixed from copper oxide in addition to its fluxing properties consisting essentially of fluorspar and forming a slag phase having an excess of calcium oxide;
 (b) oxidizing said molten crude copper to at least 1% oxygen content and converting said impurities to the acid oxides thereof;
 (c) contacting said slag phase with said molten crude copper for a sufficient time whereby said acid oxides migrate from said copper into said slag phase;
 (d) separating said slag phase from said copper.

2. The process of claim 1, wherein said calcium oxide added in step (a) has a particle size of 3–100 mm.

3. The process of claim 1, wherein the fluorspar is added as one part for 4 parts by weight of calcium oxide.

4. The process of claim 1 wherein prior to the addition of the calcium oxide the molten crude copper is oxidized for a sufficient time to produce a blue-red tessellating fracture from a cooled sample thereof, thereby producing a cuprous oxide-rich layer.

5. The process of claim 1 wherein prior to the addition of the calcium oxide the molten crude copper is oxidized for a sufficient time to produce a blue-red tessellating fracture from a cooled sample thereof thereby producing a cuprous oxide-rich layer, and removing said cuprous oxide-rich layer before the addition of said calcium oxide.

6. The process of claim 1 wherein the slag phase formed has a calcium oxide content of 35 to 45%.

7. The process of claim 1 wherein the molten crude copper has an arsenic content of 0.46 to 0.85, an antimony content of 0.21 to 0.33, and a tin content of less than 0.01 to 0.43%, and said oxidation of the molten crude copper is effected by blowing with air and oxygen at a temperature of 1250° to 1300° C.

References Cited by the Examiner

UNITED STATES PATENTS

| 1,863,419 | 6/1932 | Snelling | 75—76 |
| 1,978,537 | 10/1934 | Jeavens | 75—76 |
| 2,003,889 | 6/1935 | Jennison | 75—76 |
| 2,015,693 | 10/1935 | Perrin | 75—76 |
| 2,732,294 | 1/1956 | Hewitt | 75—76 |

FOREIGN PATENTS

| 17,941 | 1896 | Great Britain. |
| 142,441 | 3/1921 | Great Britain. |
| 311,812 | 5/1929 | Great Britain. |
| 430,869 | 6/1935 | Great Britain. |
| 741,571 | 12/1955 | Great Britain. |

OTHER REFERENCES

Butts: Copper, The Science and Technology of the Metal, Its Alloys and Compounds, Reinhold Publishing Corp., New York, 1954, pp. 223–229.

Neuton et al.: Metallurgy of Copper, John Wiley & Sons, Inc., 1942, New York, pp. 195–200.

DAVID L. RECK, *Primary Examiner.*

BENJAMIN HENKIN, *Examiner.*

H. W. CUMMINGS, H. TARRING,
         *Assistant Examiners.*